United States Patent
Wen et al.

(10) Patent No.: US 7,075,597 B2
(45) Date of Patent: Jul. 11, 2006

(54) DUAL-SCREEN LIQUID CRYSTAL DISPLAY

(75) Inventors: Chi-Jain Wen, Hsinchu (TW);
Dai-Liang Ting, Hsinchu (TW);
Shyuan-Jeng Ho, Hsinchu (TW)

(73) Assignee: Toppoly Optoelectronics Corp. (TW)

( * ) Notice: Subject to any disclaimer, the term of this patent is extended or adjusted under 35 U.S.C. 154(b) by 77 days.

(21) Appl. No.: 10/854,425

(22) Filed: May 27, 2004

(65) Prior Publication Data

US 2004/0252257 A1 Dec. 16, 2004

(30) Foreign Application Priority Data

May 30, 2003 (TW) .............................. 92114852 A (51) Int. Cl.
*G02F 1/1347* (2006.01)
*G02F 1/1335* (2006.01)
(52) U.S. Cl. ..................... 349/74; 349/62; 349/113
(58) Field of Classification Search ................ 349/62, 349/74, 113
See application file for complete search history.

(56) References Cited

U.S. PATENT DOCUMENTS

| 4,813,770 | A  | * | 3/1989 | Clerc et al. ..................... 349/74 |
| 6,344,887 | B1 | * | 2/2002 | Ma et al. ....................... 349/98 |
| 6,580,488 | B1 | * | 6/2003 | Kim ............................ 349/143 |
| 6,697,131 | B1 | * | 2/2004 | Takami et al. ................. 349/74 |
| 6,847,427 | B1 | * | 1/2005 | Yamauchi ..................... 349/113 |
| 2004/0008297 | A1 | * | 1/2004 | Ozeki et al. ................... 349/74 |
| 2004/0160888 | A1 | * | 8/2004 | Kim ............................ 369/118 |
| 2005/0036077 | A1 | * | 2/2005 | Khan et al. ................... 349/36 |

* cited by examiner

*Primary Examiner*—Tarifur R. Chowdhury
(74) *Attorney, Agent, or Firm*—Michael Bednarek; Pillsbury Winthrop Shaw Pittman LLP (57) ABSTRACT

The present invention provides a dual-screen liquid crystal display including three substrates. The first substrate has a first surface and a second surface. The first reflector layer, the first liquid crystal layer, the second substrate and the first polarization film are sequentially disposed on the first surface of the first substrate to form the first reflective LCD. The second reflector layer, the second liquid crystal layer, the third substrate and the second polarization film are sequentially disposed on the second surface of the first substrate to form the second reflective LCD.

19 Claims, 7 Drawing Sheets

DUAL-SCREEN LIQUID CRYSTAL DISPLAY

CROSS REFERENCE TO RELATED APPLICATIONS

This application claims priority to Taiwan Patent Application No. 092114852 entitled "Dual Liquid Crystal Display", filed on May 30, 2003.

FIELD OF INVENTION

The present invention relates to the structure of liquid crystal displays (LCDs) and, more particularly, to the structure of a dual-screen liquid crystal display having three substrates.

BACKGROUND OF THE INVENTION

Having two displays makes folding electronic devices, such as notebooks or folding mobile phones, more beneficial. The dual-screen liquid crystal display (LCD) of a folding electronic device typically includes two separate displays arranged back-to-back and respectively having a back light source and a liquid crystal panel. Therefore, the thickness of the typical dual-screen LCD is larger than that of a single LCD.

However, an electronic device with smaller size is preferred nowadays. Then how to decrease thickness of a dual-screen LCD becomes an issue.

SUMMARY OF THE INVENTION

One aspect of the present invention provides a dual-screen liquid crystal display (LCD) having three substrates.

The present invention provides a dual-screen LCD including three substrates. The dual-screen LCD includes a first reflective LCD and a second reflective LCD. The three substrates include a first substrate, a second substrate and a third substrate. The first substrate has a first surface and a second surface. A first reflector layer, a first liquid crystal layer, a second substrate and a first polarization film are sequentially disposed on the first surface of the first substrate to form a first reflective LCD. A second reflector layer, a second liquid crystal layer, the third substrate and a second polarization film are sequentially disposed on the second surface of the first substrate to form a second reflective LCD.

DETAILED DESCRIPTION

In the following description, corresponding components in different embodiments are indicated with the same reference numeral.

Figure 1:
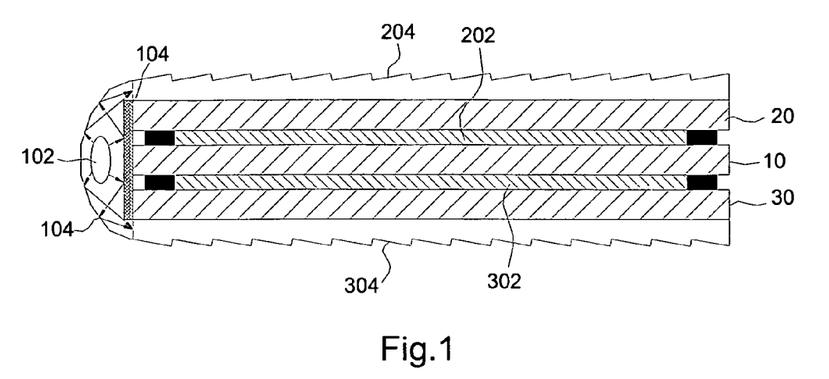
FIG. 1 is a schematic diagram showing a dual-screen liquid crystal display (LCD) of a first embodiment according to the present invention.

FIG. 1 is a schematic diagram showing a dual-screen LCD of a first exemplary embodiment according to the present invention. A first liquid crystal layer 202 is disposed between a first substrate 10 and a second substrate 20 to form a first reflective LCD. A second liquid crystal layer 302 is disposed between the first substrate 10 and a third substrate 30 to form a second reflective LCD. A light source 102, preferably a cold cathode fluorescent lamp (CCFL) or a light-emitting diode (LED), is disposed at a side of the dual-screen LCD. Light emitted by the light source 102 is reflected by a mirror 104 and respectively guided by a first light guide plate 204 and a second light guide plate 304 into the first reflective LCD and the second reflective LCD.

Figure 2:
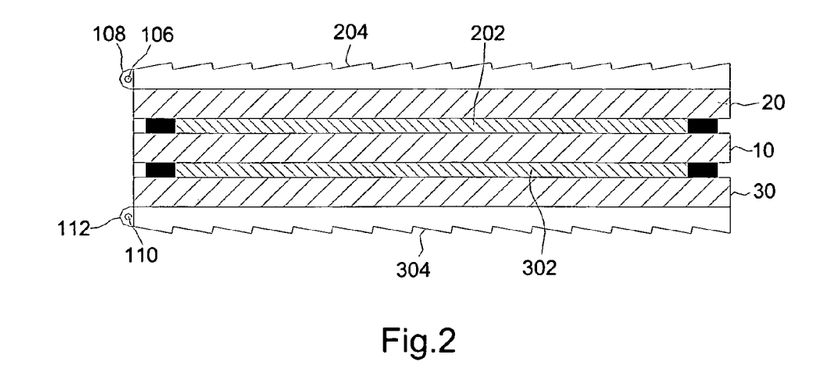
FIG. 2 is a schematic diagram showing a dual-screen LCD of a second embodiment according to the present invention.

FIG. 2 is a schematic diagram showing a dual-screen LCD of a second exemplary embodiment according to the present invention. The dual-screen LCD in FIG. 2 is similar to that in FIG. 1, except how the light source is configured. A first light source 106 is disposed at a side of the first reflective LCD. Light emitted by the first light source 106 is reflected by a first reflector 108 and guided by the first light guide plate 204 into the first reflective LCD. A second light source 110 is disposed at a side of the second reflective LCD. Light emitted by the second light source 110 is reflected by a second reflector 112 and guided by the second light guide plate 304 into the second reflective LCD.

There is a variety of LCDs, such as monochrome or color LCDs, thin film transistor LCD (TFT-LCD), twisted nematic LCD (TN-LCD) and super twisted nematic LCD (STN-LCD). Embodiments disclosing various LCDs are described below.

Figure 3:
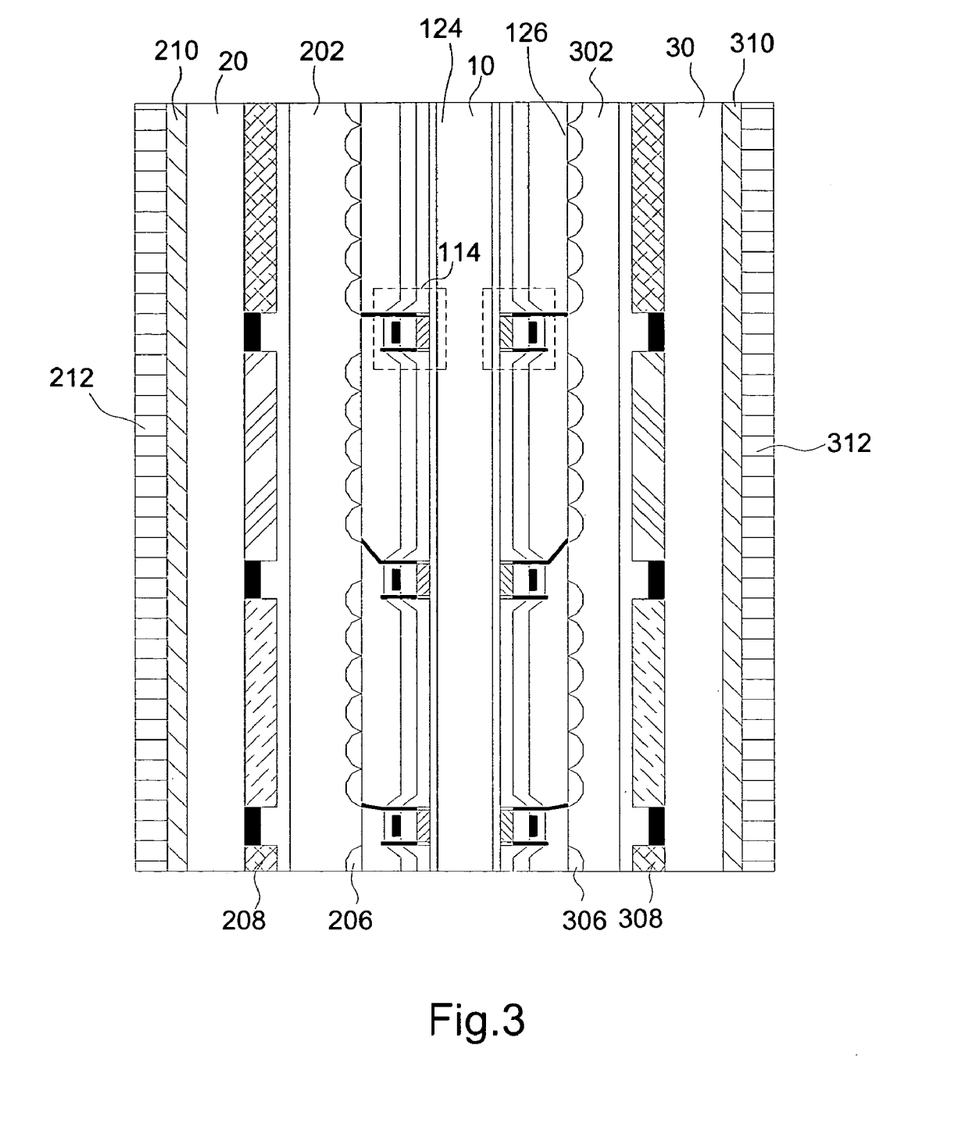
FIG. 3 is a schematic diagram showing a dual-screen LCD of a third embodiment according to the present invention, in which the dual-screen LCD includes two color thin film transistor liquid crystal displays (TFT-LCDs).

FIG. 3 is a schematic diagram showing a dual-screen LCD of a third exemplary embodiment according to the present invention. This dual-screen LCD includes two color TFT-LCDs. A thin film transistor 114, a first diffusive reflector layer 206, the first liquid crystal layer 202, a first color filter 208, the second substrate 20, a first retardation film 210 and a first polarization film 212 are sequentially disposed on a first surface 124 of a first substrate 10 to form a first reflective TFT-LCD. A second diffusive reflector layer 306, a second liquid crystal layer 302, a second color filter 308, a third substrate 30, a second retardation film 310 and a second polarization film 312 are sequentially disposed on a second surface 126 of the first substrate 10 to form a second reflective TFT-LCD.

The images displayed by the first and the second TFT-LCDs shown in FIG. 3 are controlled by two sets of thin film transistors, while using only one set of thin film transistors is possible. When the dual-screen LCD is applied to folding electronic devices, the first and the second TFT-LCDs could be selectively turned on. The related techniques are known to persons skilled in the art and are not unnecessarily described herein.

Figure 4:
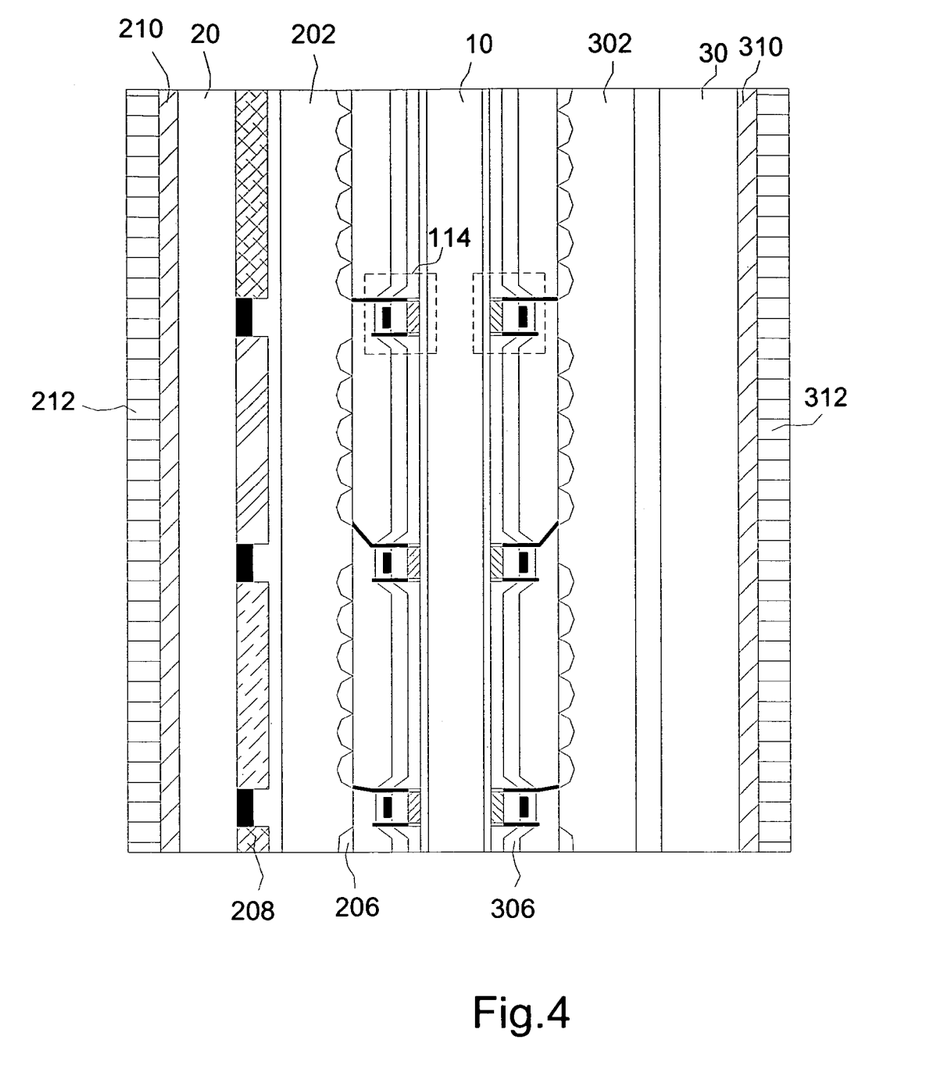
FIG. 4 is a schematic diagram showing a dual-screen LCD of a fourth embodiment according to the present invention, in which the dual-screen LCD includes one color TFT-LCD and one monochrome TFT-LCD.

FIG. 4 is a schematic diagram showing a dual-screen LCD of a fourth exemplary embodiment according to the present invention. The dual-screen LCD in FIG. 4 is similar to that in FIG. 3, except the absence of the second color filter 308. Thus, the second TFT-LCD in FIG. 4 is a monochrome display. This dual-screen LCD therefore includes one color TFT-LCD and one monochrome TFT-LCD.

Figure 5:
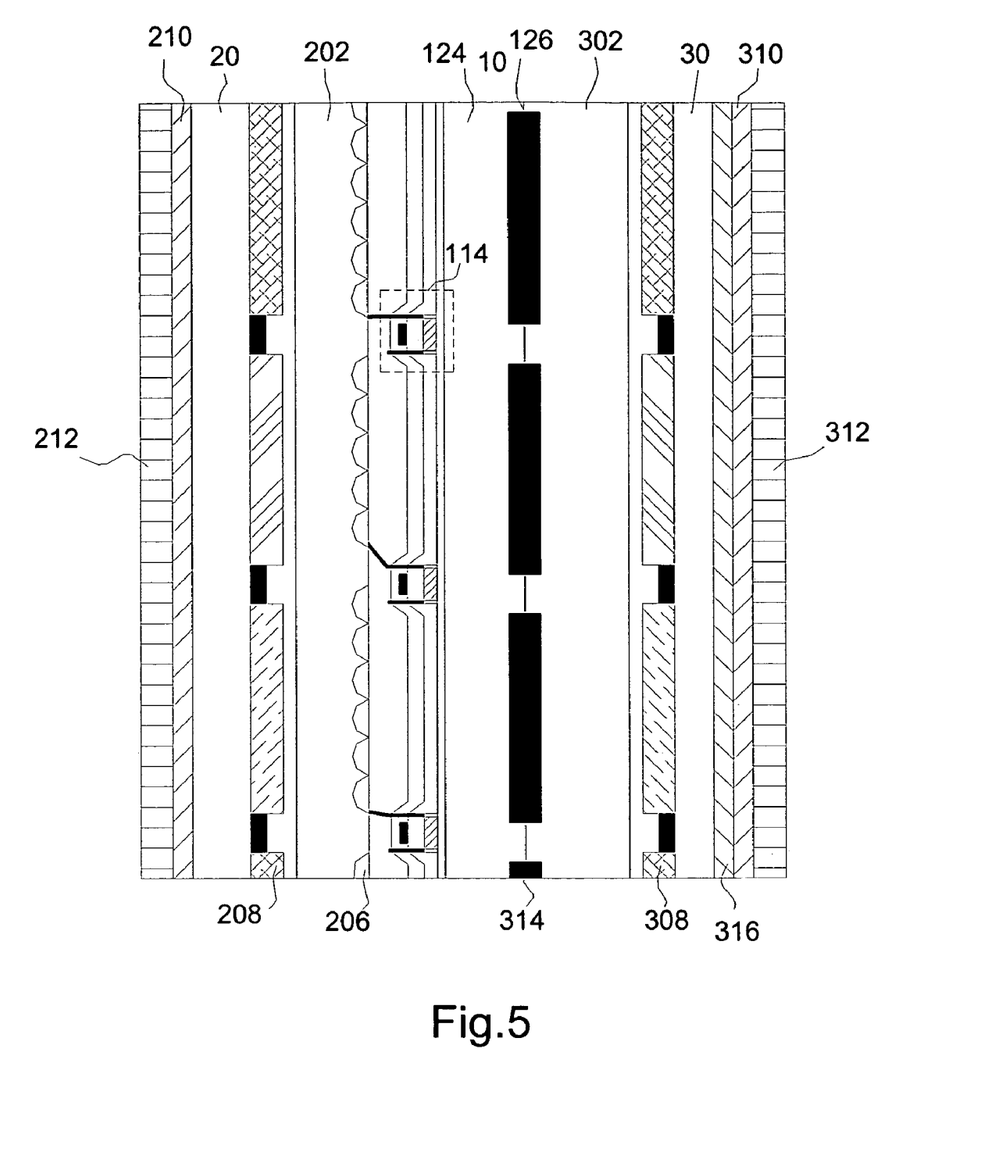
FIG. 5 is a schematic diagram showing a dual-screen LCD of a fifth embodiment according to the present invention, in which the dual-screen LCD includes one color TFT-LCD and one color super twisted nematic/twisted nematic liquid crystal display (STN/TN-LCD).

FIG. 5 is a schematic diagram showing a dual-screen LCD of a fifth exemplary embodiment according to the present invention. This dual-screen LCD includes one color TFT-LCD and one color STN-LCD. The color TFT-LCD includes a first substrate 10 having first surface 124 and a second substrate 20, and is the same as a TFT-LCD in FIG. 3. The color STN-LCD includes a mirror reflector layer 314, a second liquid crystal layer 302, a second color filter 308, a third substrate 30, a diffuser layer 316, a second retardation film 310 and a second polarization film 312 that are all sequentially disposed on a second surface 126 of a first substrate 10. In this embodiment, the combination of the mirror reflector layer 314 and the diffuser layer 316 replaces a diffusive reflector layer to reduce cost. The diffuser layer 316 may be a film with an uneven surface, a film containing particles or a layer including materials of different refractive indexes.

Through changing the material of the second liquid crystal layer 302 and altering the configuration of the driving circuit, the color STN-LCD of the dual-screen LCD in FIG. 5 could be transformed into a color TN-LCD. Then the dual-screen LCD would include a color TFT-LCD and a color TN-LCD.

Figure 6:
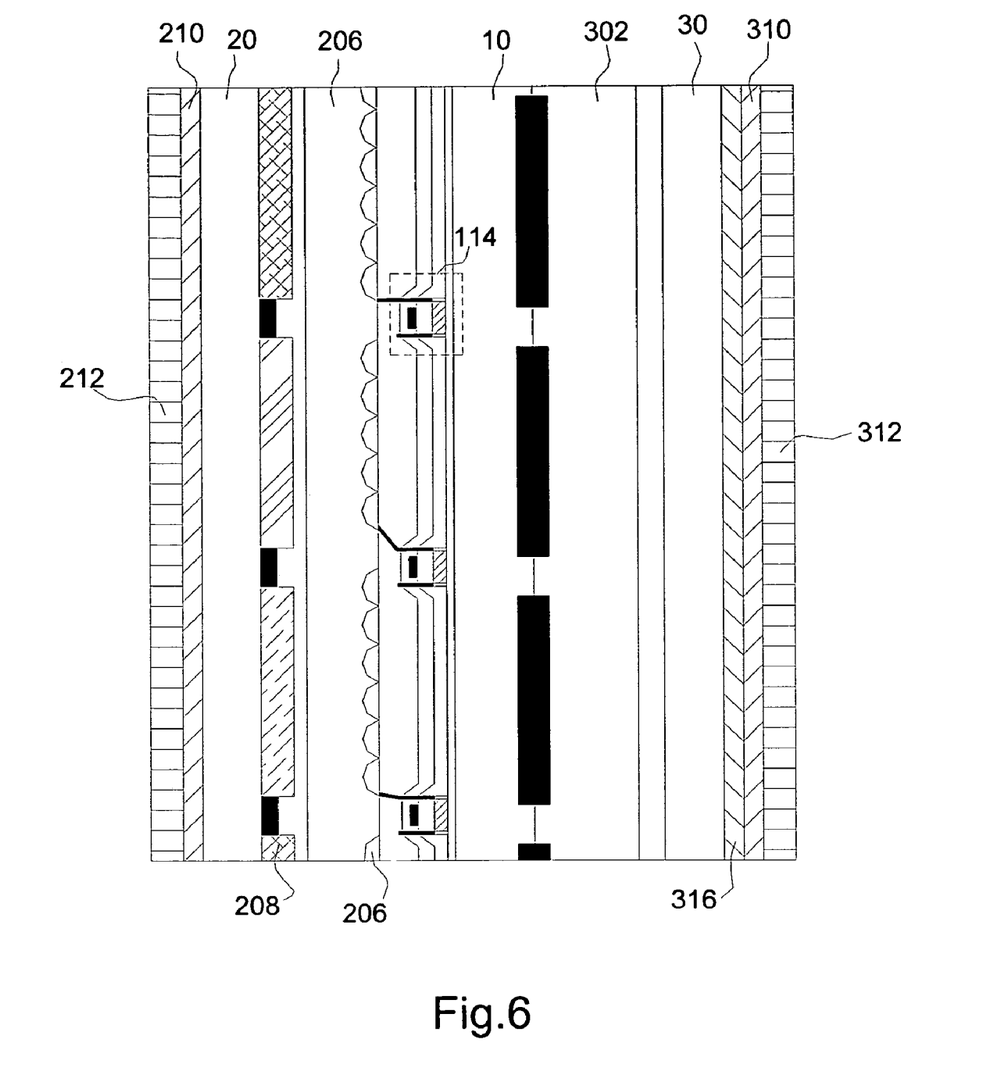
FIG. 6 is a schematic diagram showing a dual-screen LCD of a sixth embodiment according to the present invention, in which the dual-screen LCD includes one color TFT-LCD and one monochrome STN/TN-LCD.
Figure 7A:
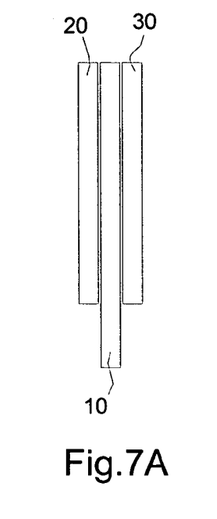
FIGS. 7A to 7E are schematic diagrams of a seventh embodiment according to the present invention which shows the configurations of three substrates, liquid crystal fill ports and flexible printed circuit boards (PCBs).
Figure 7B:
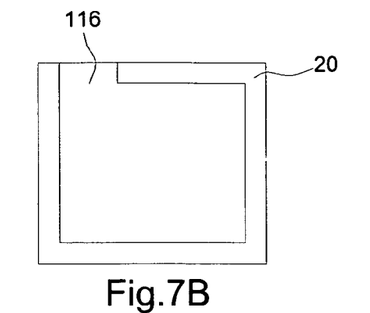
Figure 7C:
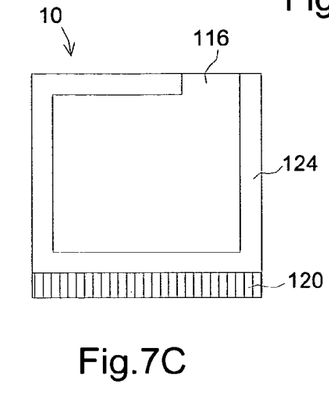
Figure 7D:
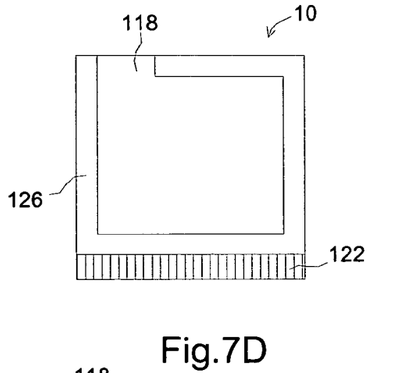
Figure 7E:
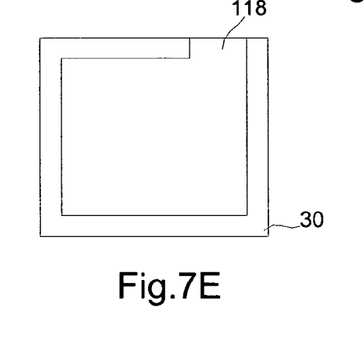
Figure 8A:
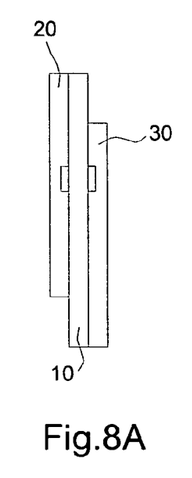
FIGS. 8A to 8E are schematic diagrams of an eighth embodiment according to the present invention which shows the configurations of three substrates, liquid crystal fill ports and flexible PCBs.
Figure 8B:
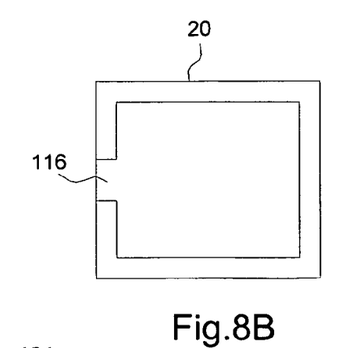
Figure 8C:
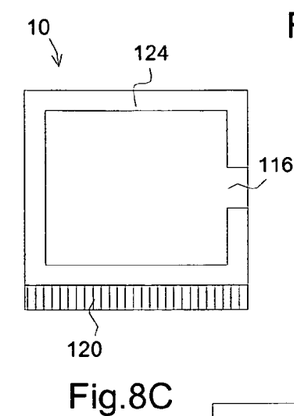
Figure 8D:
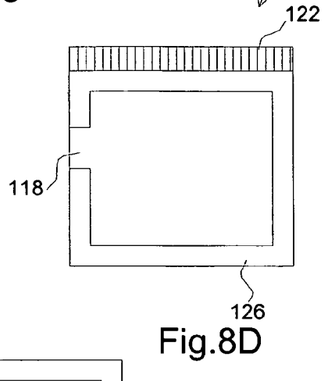
Figure 8E:
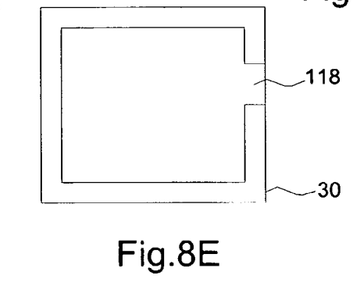

FIG. 6 is a schematic diagram showing a dual-screen LCD of a sixth exemplary embodiment according to the present invention. This dual-screen LCD includes one color TFT-LCD and one monochrome STN-LCD. The dual-screen LCD in FIG. 6 is similar to that in FIG. 5, except the absence of the second color filter 308. Therefore, the STN-LCD in FIG. 6 is a monochrome display. Through changing the material of the second liquid crystal layer 302 and altering the configuration of the driving circuit, the monochrome STN-LCD could be transformed into a monochrome TN-LCD. Then the dual-screen LCD would include a color TFT-LCD and a monochrome TN-LCD.

FIGS. 7A to 7E are schematic diagrams of a seventh exemplary embodiment according to the present invention which shows the configurations of three substrates, liquid crystal fill ports and flexible printed circuit boards (PCBs). In this embodiment, a first flexible PCB 120 and a second flexible PCB 122 are located at the same side of a first substrate 10. The first substrate 10, a second substrate 20 and a third substrate 30 are arranged as FIG. 7A. A first reflective LCD with a first liquid crystal fill port 116 includes the second substrate 20 in FIG. 7B and the first substrate 10 having a first surface 124 in FIG. 7C. A second reflective LCD with a second liquid crystal fill port 118 includes the first substrate 10 having a second surface 126 in FIG. 7D and a third substrate 30 in FIG. 7E. The first liquid crystal fill port 116 and the second liquid crystal fill port 118 are located at the same side of the dual-screen LCD, so that the liquid crystal could go through the ports 116 and 118 simultaneously.

FIGS. 8A to 8E are schematic diagrams of a eighth exemplary embodiment according to the present invention which shows the configurations of three substrates, liquid crystal fill ports and flexible PCBs. In this embodiment, a first substrate 10, the second substrate 20 and the third substrate 30 are arranged as FIG. 8A, a first flexible PCB 120 and the second flexible PCB 122 are respectively located at different sides of the first substrate 10. A first reflective LCD with a first liquid crystal fill port 116 includes the second substrate 20 in FIG. 8B and the first substrate 10 in FIG. 8C along with a first surface 124. A second reflective LCD with a second liquid crystal fill port 118 includes the first substrate 10 in FIG. 8D along with a second surface 126 and the third substrate 30 in FIG. 8E. The first liquid crystal fill port 116 and the second liquid crystal fill port 118 are located at the same side of the dual-screen LCD, so that the liquid crystal could go through the ports 116 and 118 simultaneously.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A dual-screen liquid crystal display, comprising:
   a first substrate, comprising
   a first surface and a second surface being opposite to said first surface; and a first reflector layer and a second reflector layer respectively disposed on said first surface and said second surface;
   a second substrate disposed above said first reflector layer;
   a third substrate disposed under said second reflector layer;
   a first liquid crystal layer located between said first reflector layer and said second substrate; and
   a second liquid crystal layer located between said second reflector layer and said third substrate.

2. The dual-screen liquid crystal display of claim 1, further comprising a first polarization film disposed on said second substrate and a second polarization film disposed on said third substrate; wherein said first substrate, said first reflector layer, said first liquid crystal layer, said second substrate and said first polarization film constitute a first reflective liquid crystal display, and said first substrate, said second reflector layer, said second liquid crystal layer, said third substrate and said second polarization film constitute a second reflective liquid crystal display.

3. The dual-screen liquid crystal display of claim 2, further comprising a diffuser layer between said second substrate and said first polarization film, wherein said first reflector layer is a mirror reflector layer.

4. The dual-screen liquid crystal display of claim 2, further comprising a diffuser layer between said third substrate and said second polarization film, wherein said second reflector layer is a mirror reflector layer.

5. The dual-screen liquid crystal display of claim 2, further comprising:
   a first light guide plate disposed on said first polarization film;
   a second light guide plate disposed on said second polarization film; and
   a light source and a mirror disposed at one side of said dual-screen liquid crystal display,
   light emitted by said light source being reflected by said mirror and respectively guided by said first and said second light guide plates into said first and said second reflective liquid crystal displays.

6. The dual-screen liquid crystal display of claim 5, wherein said light source is a fluorescent lamp.

7. The dual-screen liquid crystal display of claim 5, wherein said light source is a light-emitting diode.

8. The dual-screen liquid crystal display of claim 2, further comprising:
- a first light guide plate disposed on said first polarization film;
- a second light guide plate disposed on said second polarization film;
- a first light source and a first reflector disposed at one side of said first light guide plate; and
- a second light source and a second reflector disposed at one side of said second light guide plate;
- wherein light emitted by said first light source is reflected by said first reflector and guided by said first light guide plate into said first reflective liquid crystal display, and light emitted by said second light source is reflected by said second reflector and guided by said second light guide plate into said second reflective liquid crystal display.

9. The dual-screen liquid crystal display of claim 8, wherein said first and said second light sources are fluorescent lamps.

10. The dual-screen liquid crystal display of claim 8, wherein said first and said second light sources are light-emitting diodes.

11. The dual-screen liquid crystal display of claim 2, wherein said first and said second reflective liquid crystal displays are reflective thin film transistor liquid crystal displays.

12. The dual-screen liquid crystal display of claim 2, wherein said first reflective liquid crystal display is a reflective thin film transistor liquid crystal display, said second reflective liquid crystal display is a reflective twisted nematic liquid crystal display.

13. The dual-screen liquid crystal display of claim 2, wherein said first reflective liquid crystal display is a reflective thin film transistor liquid crystal display, said second reflective liquid crystal display is a reflective super twisted nematic liquid crystal display.

14. The dual-screen liquid crystal display of claim 2, wherein said first and said second reflective liquid crystal displays respectively have liquid crystal fill ports located at the same side of said dual-screen liquid crystal display.

15. The dual-screen liquid crystal display of claim 2, wherein said first reflective liquid crystal display further comprises a first flexible printed circuit board, said second reflective liquid crystal display further comprises a second flexible printed circuit board, said first and said second flexible printed circuit boards are located at the same side of said dual-screen liquid crystal display.

16. The dual-screen liquid crystal display of claim 2, wherein said first reflective liquid crystal display further comprises a first flexible printed circuit board, said second reflective liquid crystal display further comprises a second flexible printed circuit board, said first and said second flexible printed circuit boards are respectively located at different sides of said dual-screen liquid crystal display.

17. The dual-screen liquid crystal display of claim 1, wherein said first reflector layer is a diffusive reflector layer.

18. The dual-screen liquid crystal display of claim 1, wherein said second reflector layer is a diffusive reflector layer.

19. The dual-screen liquid crystal display of claim 1, further comprising:
- a first retardation film disposed on said second substrate; and
- a second retardation film disposed on said third substrate.

* * * * *